United States Patent
Aurongzeb et al.

(10) Patent No.: US 12,204,325 B2
(45) Date of Patent: Jan. 21, 2025

(54) SYSTEM AND METHOD FOR RECOMMENDING REUSE OF HARDWARE COMPONENTS ACROSS INFORMATION HANDLING SYSTEMS TO EXTEND HARDWARE LIFE

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

(*) Notice: Subject to any disclaimer, the term of this patent is extended or adjusted under 35 U.S.C. 154(b) by 374 days.

(21) Appl. No.: 17/871,629

(22) Filed: Jul. 22, 2022

(65) Prior Publication Data

US 2024/0028024 A1 Jan. 25, 2024

(51) Int. Cl.
*G05B 23/02* (2006.01)
*G06F 11/20* (2006.01)
(Continued)

(52) U.S. Cl.
CPC ...... *G05B 23/0283* (2013.01); *G06F 11/2041* (2013.01); *G06F 11/3013* (2013.01); *G06F 11/3433* (2013.01)

(58) Field of Classification Search
CPC ............ G06F 11/2041; G06F 11/3013; G06F 11/3433; G05B 23/0283
See application file for complete search history.

(56) References Cited

U.S. PATENT DOCUMENTS 8,595,234 B2  11/2013  Siripurapu
8,626,450 B2  1/2014  Dooley
(Continued)

FOREIGN PATENT DOCUMENTS

WO 2011/106160 A2 9/2011

OTHER PUBLICATIONS

C. Herrmann, et al., "Sustainability as Strategic Business Model for Profitable Business," 6 pages, May 2014.
(Continued)

*Primary Examiner* — Jigar P Patel
(74) *Attorney, Agent, or Firm* — Prol Intellectual Property Law, PLLC; H. Kenneth Prol

(57) ABSTRACT

A method of recommending reuse of hardware components across client information handling systems to extend hardware life may comprise receiving operational telemetries from a first and second information handling system, each including an error associated with a hardware type, and measured workloads on the hardware type, determining, based on the operational telemetries that a hardware component of the same type is failing at both the first and second information handling systems, and that the first information handling system is within a preset maximum distance from the second information handling system, determining failure of the component at the first information handling system is due to a workload on that component that is higher than the workload on the same component at the second information handling system, and transmitting a recommendation to replace the component at the second information handling system with the component from the first information handling system.

20 Claims, 4 Drawing Sheets

(51) Int. Cl.
    *G06F 11/30*         (2006.01)
    *G06F 11/34*         (2006.01)

(56) References Cited

U.S. PATENT DOCUMENTS

| | | |
|---|---|---|
| 10,067,840 B1 * | 9/2018 | Labaj ............... G06F 11/3058 |
| 10,417,614 B2 | 9/2019 | Johnson |
| 10,581,974 B2 | 3/2020 | Sustaeta |
| 10,705,786 B2 | 7/2020 | Liu |
| 10,977,293 B2 | 4/2021 | Cai |
| 2009/0292617 A1 | 11/2009 | Sperling |
| 2010/0070404 A1 | 3/2010 | McConnell |
| 2014/0100937 A1 | 4/2014 | Na |
| 2014/0316964 A1 | 10/2014 | Skutsker |
| 2019/0349321 A1 | 11/2019 | Cai |

OTHER PUBLICATIONS

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

* cited by examiner

SYSTEM AND METHOD FOR RECOMMENDING REUSE OF HARDWARE COMPONENTS ACROSS INFORMATION HANDLING SYSTEMS TO EXTEND HARDWARE LIFE

FIELD OF THE DISCLOSURE

The present disclosure generally relates to determining adjustments to be made reuse of hardware components across information handling systems to increase lifetime of such hardware components. More specifically, the present disclosure relates to a machine learning system for generating recommendations for reuse of a hardware component underperforming at a first information handling system, due to high workload at a second information handling system experiencing lower workload on a component of the same hardware type.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One major impact on such GHG emissions is the manufacture and transport of replacement parts, and disposal or recycling of underperforming parts to be replaced. The hardware reuse recommendation system in embodiments of the present disclosure may address this issue by making recommendations to reuse a hardware component underperforming at a first information handling system due to high workload at a second information handling system experiencing lower workload on a component of the same hardware type.

These recommendations may be based, in various embodiments described herein, on crowd-sourced data describing operational conditions across a plurality of information handling systems. For example, the hardware reuse recommendation system in embodiments of the present disclosure may recommend reuse of a hardware component currently failing due to high workload at a first client information handling system at a second client information handling system only when operational conditions at the second client information handling system do not indicate a similarly high workload on the same type of hardware component. In addition, the hardware reuse recommendation system in embodiments may only recommend reuse among client information handling systems located within a maximum geographic distance of one another. This may be the case, for example, when the GHG emissions associated with the anticipated extension of hardware component life due to reuse of a component currently failing in a first client information handling system in a second client information handling system are offset or overshadowed by the GHG emissions that would be associated with transporting the hardware component to be reused from the first information handling system to the second information handling system. In such a way, the hardware reuse recommendation system in embodiments of the present disclosure may extend the lifetime of hardware components to decrease or delay the GHG emissions associated with manufacture and transportation of new hardware components and disposal of underperforming or failing hardware components.

Figure 1:
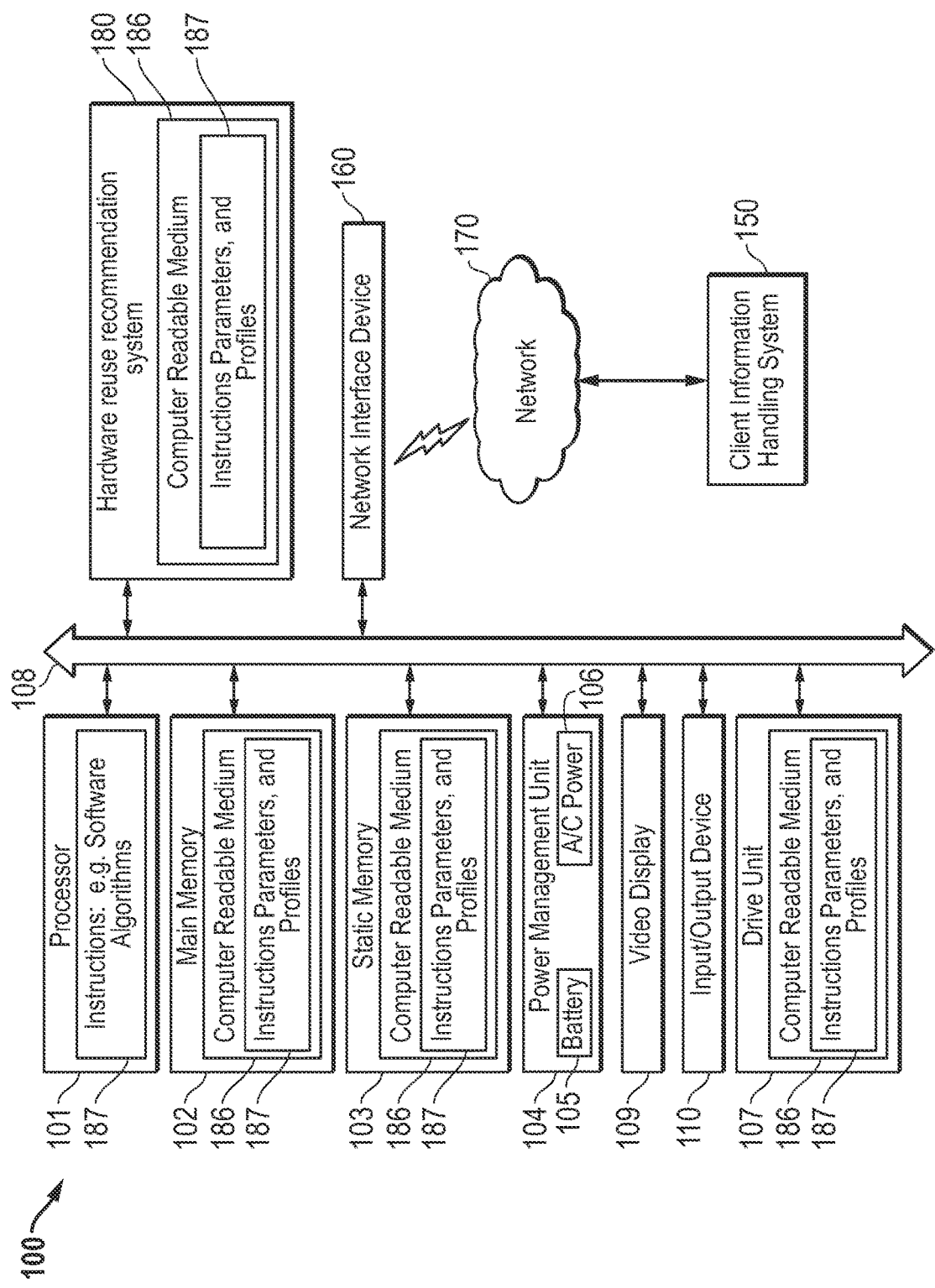
FIG. 1 is a block diagram illustrating an information handling system according to an embodiment of the present disclosure.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include a memory 102, (with computer readable medium 186 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101 executing instructions of a hardware reuse recommendation system 180, the wireless network interface device 160, a static memory 103 or drive unit 107, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 187, such as for the hardware reuse recommendation system 180 that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a processor 101 such as a central processing unit (CPU), a graphics processing unit (GPU), a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 186 storing instructions 187. In some embodiments, information handling system 100, or portions thereof, may represent a client information handling system operating various hardware components (e.g., processor 101, memory 102, network interface device 160, power management unit 104) in need of occasional replacement, and executing an agent of the hardware reuse recommendation system 180, as described in greater detail below with respect to FIG. 2. In other embodiments the information handling system 100 may represent a server information handling system a hardware reuse recommendation system 180, operating system (OS) software, application software, BIOS software, or other software applications or drivers detectable by processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, so that a device connected to a network 170 may communicate voice, video or data over the network 170. Further, the instructions 187 may be transmitted or received over the network 170 via the network interface device 160. The information handling system 100 may include a set of instructions 187 that may be executed to cause the computer system to perform any one or more of the methods or computer-based functions disclosed herein, such as classifying remote client information handling systems (e.g., 150) by similarity of operating environments, and providing recommendations for extension of life for underperforming hardware components by reusing components at a first information handling system experiencing underperformance due to high workload into a second information handling system that will place a lower, more manageable workload on that component. For example, instructions 187 may include a particular example of a hardware reuse recommendation system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The hardware reuse recommendation system 180 may utilize a computer-readable medium 186 in which one or more sets of instructions 187 may operate in part as software or firmware instructions executed on the information handling system 100. The instructions 187 may embody one or more of the methods or logic as described herein. For example, instructions relating to the hardware reuse recommendation system 180, firmware or software algorithms, processes, and/or methods may be stored here. Such instructions 187 may comprise providing recommendations for extension of life for underperforming hardware components by reusing components at a first information handling system experiencing underperformance due to high workload into a second information handling system that will place a lower, more manageable workload on that component. The hardware reuse recommendation system 180 may operate within a Unified Endpoint Management (UEM) platform that gathers telemetries from a plurality of client information handling system 150 endpoints via the network 170 that describe operating environments for those client information handling systems (e.g., 150). The UEM platform in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a sever executing a UEM platform. In other embodiments, the information handling system 100 may depict a client information handling system (e.g., 150) that reports to a UEM and receives recommendations from the UEM pursuant to various embodiments described herein.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the hardware reuse recommendation system 180 may be stored in static memory 103, or the drive unit 107 on a computer-readable medium 186 such as a flash memory or magnetic disk in an example embodiment. More specifically, telemetries describing heat measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
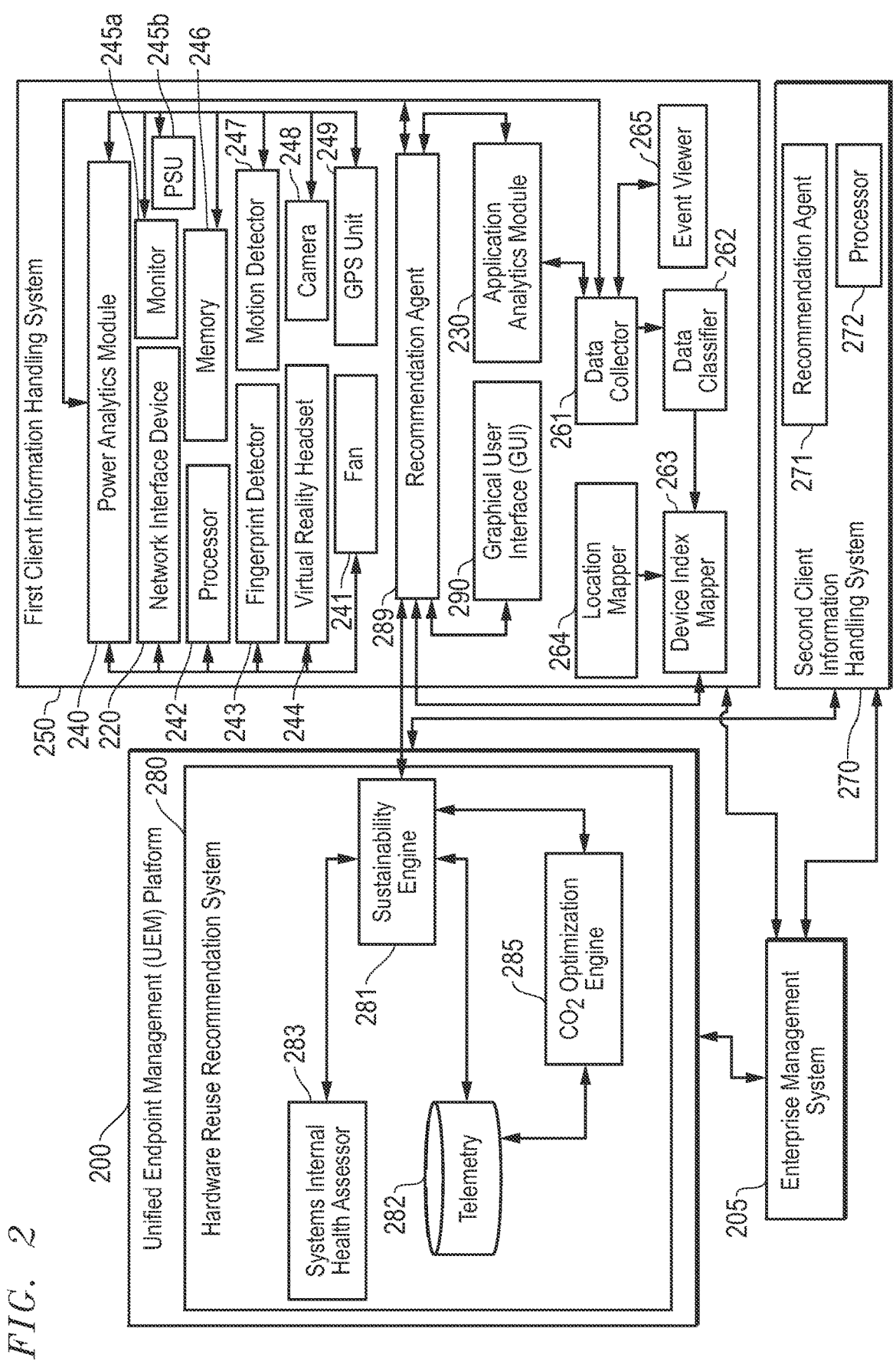
FIG. 2 is a block diagram illustrating a hardware reuse recommendation system according to an embodiment of the present disclosure.

FIG. 2 is a block diagram illustrating a hardware reuse recommendation system communicating recommended transfer of hardware components between multiple information handling systems in order to extend hardware life according to an embodiment of the present disclosure. A unified endpoint management (UEM) platform 200 in an embodiment may execute a hardware reuse recommendation system 280 to extend hardware lifetimes at a plurality of client information handling systems (e.g., 250 and 270) under management of or in communication with an enterprise management system 205, which may act as an interface between the client information handling system (e.g., 250 or 270) and the UEM platform 200. The UEM platform 200 and enterprise management system 205 in an embodiment may operate as a cloud-based service in communication with the enterprise management system 205 via a network to identify information technology (IT) issues at a first client information handling system 250, or a second client information handling system 270. The UEM platform 200 may also provide support for such issues, including automatically updating drivers or hardware components, as needed. In a specific embodiment of the present disclosure, the UEM platform 200 may gather telemetries from a plurality of client information handling system (e.g., 250 and 270) that describe operating environments for those client information handling systems (e.g., heat measurements, failures or errors associated with one or more hardware components, or analytics for software usage).

A hardware reuse recommendation system 280 operating at the UEM platform 200 in an embodiment may generate recommendations for transfer of hardware components between multiple information handling systems (e.g., 250 and 270) for the purpose of extending a lifetime of one or more hardware components. These recommendations (e.g., for transfer of a hardware component from 250 to 270) may be made based upon a hardware component experiencing underperformance at the first information handling system 250 due to high workload would experience a significantly lower workload unlikely to cause similar underperformance at the second information handling system 270. The hardware reuse recommendation system 280 in an embodiment may determine such a recommendation is appropriate based upon telemetry data gathered from a pool of information handling systems including 250 and 270, and others in various embodiments. The hardware reuse recommendation system 280 in an embodiment may use a machine learning approach to classify analytics performance data for each information handling system (e.g., 250 and 270) according to types of hardware and software errors, failures, or warnings, as well as hardware and software performance metrics.

The UEM platform 200 may receive such telemetries from a plurality of client information handling systems (e.g., 250 and 270), which may be managed by the same enterprise management system (e.g., 205), or may be managed by separate enterprise management systems in various embodiments. Each client information handling system (e.g., 250 or 270) in an embodiment may include a plurality of hardware components. For example, a first client information handling system 250 in an embodiment may include a network interface device 220, a processor (e.g., central processing unit (CPU), graphics processing unit (GPU), or visual processing unit (VPU)) 242, a monitor 245a, and a memory 246, and one or more components of a power supply unit 245b (e.g., battery). In some embodiments, the first client information handling system 250 may further include one or more sensing devices, such as a fingerprint detector 243, a motion detector 247, location sensing devices 249 (e.g., GPS location unit), a fan 241, or camera 248, which may also be used during execution of videoconferencing software applications, for example. In another embodiment, the first client information handling system 250 may further be operably connected to one or more peripheral devices, such as a virtual reality headset 244, for example. Such an operable connection may employ a driver or firmware for such a peripheral device in such an embodiment. One or more of the other hardware components described herein (e.g., 220, 241, 242, 243, 244, 245a, 245b, 246, 247, 248, or 249) may further operate according to firmware or driver instructions in an embodiment.

A power analytics module 240 in an embodiment may be in communication with various hardware components (e.g., 220, 241, 242, 243, 244, 245a, 245b, 246, 247, 248, or 249) and firmware for those components in an embodiment. For example, the power analytics module 240 may monitor power consumption by each of the various hardware components (e.g., 220, 241, 242, 243, 244, 245a, 245b, 246, 247, 248, or 249), or execute performance benchmark testing for those components in an embodiment. More specifically, the power analytics module 240 may test the performance of one or more hardware components by executing sample tasks similar to tasks performed by those devices routinely. For example, the power analytics module 240 may test the processor's 242 ability to perform a series of basic mathematical functions, the memory's 246 ability to access a large amount of data stored randomly throughout the drive, a graphic processing unit's 242 ability to draw, move and scale lines, fonts, and elements within a user interface. The speed and accuracy with which each component completes these basic tasks may be scored by the power analytics module 240 to provide a test benchmark score. Several existing benchmark testing applications may provide this functionality, including, for example, Geekbench®, NovaBench®, PassMark®, and AnTuTu®.

In another example embodiment, the power analytics module 240 may also access firmware for hardware components (e.g., 220, 241, 242, 243, 244, 245a, 245b, 246, 247, 248, or 249) to determine policies or settings for those components at the time of such power measurements. More specifically, the power analytics module 240 in an embodiment may determine whether a network interface device 220 is transceiving according to WLAN, WWAN, Bluetooth®, or Near Field Communication (NFC) standards, as well as policies setting a preference for one type of standard over another, or restrictions on power consumption, data rate, or frequencies used by the network interface device 220. In another example, the power analytics module 240 in an embodiment may determine current usage as a percentage of total capacity for the processor 242 (e.g., central processing unit (CPU), graphics processing unit (GPU), or visual processing unit (VPU)). In still another example, the power analytics module may determine current usage as a percentage of total capacity for memory 246, time required to process requests to access such memory 246, and identify software applications most frequently accessing such memory 246. In yet another example, the power analytics module 240 in an embodiment may determine a usage mode for the monitor 245a, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the fingerprint detector 243, motion detector 247, location sensing device (e.g., GPS unit) 249, or camera 248 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 248, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

The power analytics module 240 in an embodiment may also be capable of adjusting such policies within firmware for one or more hardware components, upon user approval. For example, the power analytics module 240 in an embodiment may instruct a network interface device 220 to transceive according to the Bluetooth®, rather than WLAN or WWAN, or reset policies for the network interface device 220 to restrict power consumption, data rate, or frequencies used. In another example, the power analytics module 240 in an embodiment may adjust the usage mode for the monitor 245a to a lower power consumption mode, such as power reserve mode, or lower resolution mode. In still another example embodiment, the power analytics module 240 may decrease the periods in which sensing hardware may be operational, such as restricting such periods to when the first client information handling system 250 is in a closed position, an idle or sleep mode, currently moving, or in startup mode. In yet another embodiment, the power analytics module 240 may adjust the media capture instructions setting for the camera 248 by decreasing a resolution of captured images or a frequency at which those images are captured, or limiting execution of any processing algorithms that may be applied to those images (e.g., zooming, cropping, background image application, boundary recognition, face recognition, smoothing, etc.).

In an embodiment, the power analytics module 240 may also be capable of determining the current versions of drivers for various hardware components (e.g., 220, 241, 242, 243, 244, 245a, 245b, 246, 247, 248, or 249). In some embodiments, the power analytics module 240 may receive updated drivers, direct installation of those drivers, or pause repeated attempts at unsuccessful driver installations in order to increase efficiency of associated hardware components (e.g., 220, 241, 242, 243, 244, 245a, 245b, 246, 247, 248, or 249). In other embodiments, the power analytics module 240 may also identify and delete obsolete or redundant files associated with previously replaced or obsolete drivers, and track power consumed during installation or updating of such drivers. In still other embodiments, the power analytics module 240 may further determine power consumed during updates made to various software applications executing via the processor 242 (e.g., CPU, GPU, or VPU).

As described above, the power analytics module 240 may be in communication with a data collector 261, which may also be in communication with an application analytics module 230. In an embodiment, the application analytics module 230 may monitor and adjust execution of software applications within the operating system (OS) for the first client information handling system 250. The application analytics module 230 in an embodiment may further track which software applications are running or idle (e.g., executing in the background) at various times, and track current versions of software applications and times at which updates to such software applications are performed. In still another example, the application analytics module 230 may determine current usage as a percentage of total capacity for memory 246, time required to process requests to access such memory 246, and identify software applications most frequently accessing such memory 246. Information gathered by the application analytics module 230 in such an embodiment may be communicated to the data collector 261.

As described herein, the data collector module 261 in an embodiment may gather data regarding hardware configuration and power consumption from the power analytics module 240 and data regarding software performance and processor/memory usage from the application analytics module 230. In some embodiments, the data collector 261 may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error. Such WHEA events may be associated with data packets that specifically identify the hardware component (e.g., 220, 241, 242, 243, 244, 245a, 245b, 246, 247, 248, or 249) producing the error. The data collector 261 may routinely collect information from each of the power analytics module 240, the application analytics module 230 or the event viewer 265 at preset intervals, or may do so upon notification by one of these modules (e.g., 230, 240, or 265) of a specific event, failure, or warning, such as a temperature measurement exceeding a preset maximum temperature threshold value.

Information recorded by the event viewer 265 in an embodiment may be output in the form of a log, while information recorded by the power analytics module 240 or the application analytics module 230 may be output into reports. The format of such a log or report may vary, which may require reformatting of such information into an easily classified, sorted, and searchable format. Thus, the data collector 261 in an embodiment may operate to reformat any received logs or reports into a predetermined data interchange format such as JavaScript Object Notation (JSON), or Extensive Markup Language (XML). Specific examples described herein may use the JSON format for consistency and ease of explanation, but any other type of existing or later developed predetermined data interchange format agreed upon between data sinks and sources may be used in various embodiments, including Yet Another Markup Language (YAML), for example.

The data collector 261 in an embodiment may transmit information received at any given time from the power analytics module 240, application analytics module 230, or event viewer 265) and reformatted to a predetermined data interchange format (e.g., JSON) based to a data classifier 262. Such a JSON-formatted report or log may be referred to herein as a JSON event. Each JSON event may include any information gathered from the power analytics module 240, application analytics module 230, or event viewer 265 and a time stamp associated with either the time the analytics module report was generated, or the time at which a WHEA (or other known convention for categorizing processing events) error occurred. A JSON event may include a single WHEA error (e.g., processors 242 or 272 error), or a single notification or warning from an analytics module (e.g., temperature monitor recorded a temperature exceeding a preset maximum temperature threshold value). A plurality of JSON events may be gathered to generate a JSON incident, which may include information routinely gathered at intervals, such as current configurations or policies for various hardware components (e.g., 220, 241, 242, 243, 244, 245a, 245b, 246, 247, 248, or 249) or software applications, power consumption of those components over a known monitoring time period, current versions of drivers or software applications, and timestamps for installation of updates to such drivers or software applications. Such information may be illustrated by the following table:

TABLE 1

| | |
|---|---|
| Timestamp | 1655156447 |
| Client Device ID | 123456 |
| Incident ID | 456789 |
| Errors, notifications, warnings | Workload on processor: 90% WHEA error at processor |
| Location | Austin, TX |
| Model | Laptop 7400 |
| Hardware Configuration | WLAN network interface device; WWAN network interface device; Bluetooth ® network interface device; 16 GB memory; X series CPU; G Series GPU; 256 GB Solid State Drive (SSD); 15.6 inch full high definition (HD) organic light emitting diode (OLED) display; |
| Software Performance | Operating System 10.2; Video Conference Software Application using 90% antenna; Code Compiling Software Application using 90% CPU; Gaming Software Application using 90% GPU; |

Some or all of the information displayed above within TABLE 1 may be formatted as a JSON incident in an embodiment, where the JSON incident may represent all of the information given within the table and may include one or more JSON events. A JSON event in an embodiment may be a single dataset name/value pair, formatted into a JSON-formatted string value. For example, the first row of Table 1 may provide information that can be stored as a dataset field name (e.g., "Timestamp") and a dataset field value (e.g., "1655156447") which may be combined to form a name/value pair. This name/value pair may be rewritten as a JSON-formatted string value (e.g., "Timestamp": 1655156447) to form a single JSON event. In another example, the fourth row of Table 1 may provide information that forms a plurality of JSON events. For example, information from the fourth row may be stored as a first name/value pair having a field name "code compiling app workload on CPU" and a value of 0.90 (e.g., 90%), and as a second name/value pair having a field name "WHEA error" and a value of CPU, indicating a WHEA error associated with the CPU has been detected. The reports and error logs generated by the power analytics module 240, the application analytics module 230, and the event viewer 265 in an embodiment may each include one or several of such name/value pairs, and thus, may form the foundation of one or several JSON events.

A plurality of JSON events may be combined into a single JSON incident in an embodiment. Such a JSON incident may include a plurality of JSON events generated based on name/value pairs from one or more reports and error logs from the power analytics module 240, the application analytics module 230, or the event viewer 265. For example, in one embodiment, the first information handling system 250 may generate a single JSON incident for each report or event log generated by the application analytics module 230, power analytics module 240, or event viewer 265. In another example embodiment, the first information handling system 250 may routinely generate a single JSON incident at preset intervals, which may include all information from all reports or event logs generated by the application analytics module 230, the power analytics module 240, or the event viewer 265 during this preset interval. Thus, a JSON incident may include at least two JSON events, including a timestamp for the generation of the JSON incident (e.g., the time at which the underlying report or event log was generated, or the time at which such underlying reports or event logs were compiled together for a given preset time period), as well as at least one name/value pair indicating the contents of such an underlying report or event log.

A JSON incident may identify an incident ID, a source for dataset name/value pairs used to generate one or more JSON events (e.g., power analytics module 240, applications analytics module 230, or event viewer 265), a timestamp for the incident, one or more custom flags identifying the errors, notifications, or warnings, and one or more device current states, identifying the software and hardware configurations and performance statistics. For example, a JSON incident compiling information shown within Table 1 above may be shown as:

```
{
  "data" :
  {
    "incident_id" : 456789,
    "source_ID" : power_analytics_module,
    "timestamp_unixtime_ms" : 1544145336,
    "custom_flags" :
    {
      "CPU_workload_code_compiling_software_app" : 0.90,
      "WHEA_Error" : CPU,
    }
    "device_current_state :
    {
      "NID_1_type" : WLAN,
      "NID_2_type" : WWAN,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "OS_Version" : 10.2
      "Video_Conference_App" : Active
      "Gaming_App" : Active
      "Code_Compiling_App" : Background
    }
  }
}
```

In other embodiments, TABLE 1 and the correlating JSON incident may further include identification of additional hardware components actively operating at the client information handling system 250, such as the fingerprint detector 243, motion detector 247, virtual reality headset 244, camera 248, fan 241, or GPS unit 249. The example given above in TABLE 1 and the corresponding above JSON incident may further include any number of other errors, notifications, or warnings, hardware configurations, software performance analytics, or descriptions of policies in place for hardware or software at the client information handling system 250, as monitored by either the power analytics module 240 or the application analytics module 230.

Upon reformatting of information in an embodiment, the data collector 261 may transmit the JSON incident to the data classifier 262. In an embodiment, the data classifier 262 may operate to analyze the contents of the JSON incident, to classify the type of JSON events included therewithin, and to edit the JSON incident to generate a second JSON incident that includes that classification type.

Classification types may be preset according to instructions received by the hardware reuse recommendation system 280 by the recommendation agent 289. Such classification types may assist the sustainability engine 281 and systems internal health assessor 283 in determining recommendations to extend lifetimes of various hardware components by reusing hardware components failing due to high workload in other information handling systems that do not require the same workload capacity, as described in greater detail below. For example, the hardware reuse recommendation system 280 may make recommendations based on information describing hardware workloads, software application usage, and background software application usage. In order to successfully reuse hardware in such a way, the JSON incidents describing such errors, workloads, or application usage may be categorized according to estimated causes of hardware failure or underperformance. For example, it may not be appropriate or efficient to reuse a hardware component that has failed at a first information handling system due to a workload exceeding a preset threshold value (e.g., 85%) in a second information handling system that routinely uses the same hardware component at the same or higher preset threshold value, as this will likely generate the same failure at the second information handling system. Thus, each of these information types may be associated with a separate preset classification type. In other embodiments, other classification types, such as software resource use, hardware configuration, or driver performance, may be preset and available for use in classifying JSON incidents received from the data collector 261.

Incident classifications in an embodiment may be associated with one or more previously identified event values. For example, an incident classification for "workload," identifying relatively high workloads that may result in various hardware component failures in an embodiment may be associated by the hardware reuse recommendation system 280 with JSON events titled "CPU_workload_code_compiling_software_app" having a value exceeding a preset threshold value (e.g., 85%). In another example, an incident classification for "Config," identifying a hardware configuration or policy that may result in various hardware component failures in an embodiment may be associated with JSON events titled "Config," having a value such as "full_power_mode" (e.g., indicating full power supplied to the monitor), "active_sensing_mode" (e.g., indicating sensing hardware components set to remain on), "High_Definition_Mode" (e.g., indicating GPU or monitor set to display in high definition). In yet another example, an incident classification for "app_usage," identifying relatively intensive usage of software applications that may result in various hardware component failures in an embodiment may be associated with JSON events titled "App_usage" having a value exceeding a preset threshold value (e.g., 85%). In still another example, an incident classification for "driver_performance," identifying poor or inefficient driver performance (e.g., as indicated by a percentage of calls to that driver resulting in an error over a preset time period) that may result in various hardware component failures in an embodiment may be associated with JSON events titled "driver_perf" having a value exceeding a preset threshold value (e.g., 50%). In yet another example, an incident classification for "background_usage," identifying relatively intensive usage of software applications operating in idle mode or in the background that may result in various hardware component failures in an embodiment may be associated with JSON events titled "background_usage" having a value exceeding a preset threshold value (e.g., 85%). Any numerical or percentage maximum application usage threshold values preset as described directly above may be set to any number between one and one hundred in various embodiments described herein.

In an example embodiment, the data classifier 262 in an embodiment may analyze the JSON incident described above to identify whether any of the JSON events and values associated with preset incident classifiers appear within the JSON incident. For example, the data classifier 262 in an embodiment may determine the JSON incident described above includes the JSON event named "CPU_workload," having a value of 0.90, or 90%, which is greater than the preset maximum CPU workload of 85%, in an example embodiment. In such an embodiment, the data classifier 262 may classify the JSON incident described above as "workload," indicating a high detected workload may be causing decreased efficiency or functionality of one or more hardware components generating WHEA errors. The data classifier 262 in an embodiment may apply such a classification by editing the JSON incident received from the data collector 261 to generate a classified JSON incident that includes the following incident classification, in addition to the data nodes described above, within the JSON incident:

```
{
    "incident_class" : Workload
}
```

The classified JSON incident in an embodiment may be transmitted to the device index mapper 263, which may operate to associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. In some embodiments, the device index mapper 263 may also retrieve a location for the first client information handling system 250 from the location mapper 264 or the GPS unit 249. In some cases, the location mapper 264 may represent the location of the first client information handling system 250 with reference to its location within a campus of an enterprise. More specifically, the first client information handling system 250 may be located on a specific floor of a specific building. The device index mapper 263 in an embodiment may then edit the classified JSON incident to generate a first indexed and classified JSON incident that includes this information, such as shown directly below, which is then transmitted to the recommendation agent 289, and then to the sustainability engine 281 of the UEM platform 200:

```
{
"data" :
    {
        "client_device_ID" : 123456,
        "client_device_model" : Laptop_7400,
        "incident_id" : 456789,
        "source_ID" : power_analytics_module,
        "timestamp_unixtime_ms" : 1544145336,
        "location" : Austin_Texas,
        "custom_flags" :
            {
                "CPU_workload_code_compiling_software_app" : 0.90,
                "WHEA_Error" : CPU,
            }
        "device_current_state :
            {
                "NID_1_type" : WLAN,
                "NID_2_type" : WWAN,
                "NID_3_type" : BT,
                "memory_type" : 16_GB,
                "CPU_type" : X_Series,
                "GPU_type" : G_Series,
                "SSD_type" : 256_GB,
                "Display_type" : 15.6_HD_OLED,
                "OS_Version" : 10.2
                "Video_Conference_App" : Active
                "Gaming_App" : Active
                "Code_Compiling_App" : Background
            }
    }
"incident_class" : Workload
}
```

In another aspect of an embodiment, the second client information handling system 270 may transmit a second indexed and classified JSON incident describing software or hardware configuration and performance, device ID, and incident classification for the second client information handling system 270:

```
{
  "data" :
  {
    "client_device_ID" : 951357,
    "client_device_model" : Laptop_5400,
    "incident_id" : 456852,
    "source_ID" : power_analytics_module,
    "timestamp_unixtime_ms" : 1544145449,
    "location" : Dallas_Texas,
    "custom_flags" :
      {
        "WHEA_Error" : CPU,
        "Device_End_of_Life" : CPU,
      }
    "device_current_state :
      {
        "NID_1_type" : WLAN,
        "NID_2_type" : WWAN,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "OS_Version" : 10.2
        "Video_Conference_App" : Active
        "Gaming_App" : Active
      }
  }
  "incident_class" : Config
}
```

Such a second indexed and classified JSON incident generated by the second client information handling system 270 in an example embodiment may include a data node identifying a second incident ID, a source for the incident (e.g., power analytics module of the second client information handling system 270), a timestamp for the second incident, one or more custom flags identifying the errors, notifications, or warnings generated at the second client information handling system 270, and one or more device current states, identifying the software and hardware configurations and performance statistics for the second client information handling system 270. More specifically, the second indexed and classified JSON incident shown directly above, as generated by the second client information handling system 270 may indicate that the second client information handling system 270 is an older or less sophisticated model (e.g., laptop 5400 series) than the first client information handling system 250 (e.g., laptop 7400 series). Further, the second indexed and classified JSON incident shown directly above may indicate failure of the CPU, as described by a WHEA error, which may be similar or identical to a failure of the CPU at the first client information handling system 250, as shown in the first indexed and classified JSON incident described above. The second indexed and classified JSON incident described directly above may also include a notification, generated within a report of the power analytics module for the second client information handling system 270 that the CPU (e.g., processor 272) has reached a projected or estimated end of life. More specifically, the second indexed and classified JSON incident may include the custom flag "'Device_End_of_Life': CPU."

Notably, the incident classification "config" given to the second indexed and classified JSON incident described directly above in such an example embodiment may point to a configuration of the second client information handling system 270, rather than to a high workload indicated by the incident classification "workload" given in the first indexed and classified JSON incident generated by the first client information handling system 250. A classification of "config" in an embodiment may indicate issues associated with policy settings for a given hardware component (e.g., processor 272), or may indicate that a given hardware component (e.g., processor 272) has reached a predicted end of life but is not currently experiencing a high workload. The incident classification "config" in such an embodiment may be applied in such an embodiment due to the custom flag "'Device_End_of_Life': CPU," being present within the second indexed and classified JSON incident, for example. In other embodiments, the "config" classification may be applied when a hardware component (e.g., processor 272) has generated one or more WHEA errors in the absence of a high workload on that hardware component.

As described herein, such classification types may assist the sustainability engine 281 and systems internal health assessor 283 in determining recommendations to extend lifetimes of various hardware components by reusing hardware components failing due to high workload in other information handling systems that do not require the same workload capacity. For example, the second indexed and classified JSON incident generated by the second client information handling system 270 in an embodiment may indicate active use of a video conferencing software application and a gaming software application, but may not indicate use of a code compiling software application. In contrast, the first indexed and classified JSON incident generated by the first client information handling system 250 in an embodiment may not only indicate usage of the code compiling software application, but may further indicate that the code compiling software application is consuming 90% of the processing resources for the CPU generating the WHEA error.

The hardware reuse recommendation system 280 operating at the UEM platform 200 in an embodiment may include a sustainability engine 281, telemetry storage 282, a systems internal health assessor 283, and a CO2 optimization engine 285. The sustainability engine 281 in an embodiment may operate to routinely gather indexed and classified JSON incidents from recommendation agents (e.g., 289 and 271) operating at a plurality of information handling systems (e.g., 250, and 270, respectively). Each indexed and classified JSON incident thus received in an embodiment may be stored in telemetry 282 for later analysis by the Systems Internal Health Assessor (SIHA) 283 or the hardware reuse recommendation system 280. Such telemetry 282 may also include information such as an equivalent CO2 emissions value determined at one or more client information handling systems (e.g., 250) resulting from usage of software applications, or known statistics for GHG emissions due to power consumption in the measured location of a client information handling system (e.g., 250). In another aspect, the telemetry 282 may also include results of benchmark testing performed at the power analytics modules (e.g., 240) of each of a plurality of information handling systems (e.g., 250 and 270) transmitting indexed and classified JSON incidents to the UEM platform 200, in an embodiment. As described herein, the power analytics module 240 may test the performance of one or more hardware components by executing sample tasks similar to tasks performed by those devices routinely. The power analytics module 240 may assign a test benchmark score for each tested hardware component (e.g., 242), based on the speed and accuracy with which each component completes these basic tasks.

The SIHA 283 in an embodiment may search telemetry 282 data to identify indications within the indexed and classified JSON incidents of hardware failures, errors, or underperformance at reporting client information handling systems (e.g., 250 or 270). For example, the SIHA 283 in an embodiment may search the first and second indexed and classified JSON incidents described above, which have been transmitted to the sustainability engine 281 and stored in telemetry 282 to identify the same JSON event named "WHEA_Error," having the same value of CPU in both the first and second indexed and classified JSON incidents, indicating an error at the CPU 242 of the first information handling system 250 and an error at the CPU 272 of the second client information handling system 270. As described above, any of a number of WHEA or other conventionally recorded errors may appear within indexed and classified JSON incidents and may identify any of the hardware components (e.g., 220, 241, 242, 243, 244, 245*a*, 245*b*, 246, 247, 248, or 249) operating at the client information handling systems 250 and 270 in an embodiment. Upon identification of such an error associated with an identified hardware component, the SIHA 283 may transmit a notification to the sustainability engine 281 that the indexed and classified JSON incident (e.g., identified by incident_id given within the indexed and classified JSON incident) indicates poor health of a hardware component.

In other embodiments, the sustainability engine 281 may identify indications in one or more indexed and classified JSON incidents received from an information handling system that a hardware component is currently failing. For example, the SIHA 283 may determine that a component is failing if one or more indexed and classified JSON incidents for the information handling system (e.g., 250) using that hardware component (e.g., 242) include a number of WHEA errors for that component (e.g., 242) that meets or exceeds a maximum error threshold (e.g., 100, 50, 10, 5) within a preset period of time (e.g., 24 hours). These are only example maximum error threshold values and preset time period values, and any values for these thresholds are contemplated herein.

As another example, the SIHA 283 may determine that a component is failing if one or more indexed and classified JSON incidents for the information handling system (e.g., 250) indicate a test benchmark score for that component (e.g., 242) that falls below a preset minimum benchmark threshold value (e.g., 85% of average crowd-sourced benchmark value). As described above, the telemetry 282 may store results of benchmark testing performed at the power analytics modules (e.g., 240) of each of a plurality of information handling systems (e.g., 250 and 270) testing the performance of one or more hardware components by executing sample tasks similar to tasks performed by those devices routinely. For each hardware component type (e.g., CPU, GPU, memory, PDU, network interface device, etc.), the SIHA 283 in an embodiment may determine the average test benchmark value across a plurality of information handling systems (e.g., 250 and 270), against which test benchmark values for individual components (e.g., 242, 246, 235*b*, 220) may be compared in order to determine whether such an individual component is underperforming or failing. For example, the SIHA 283 may determine that the processor 242 of the first information handling system 250 is failing in an embodiment in which the test benchmark score for that processor 242, as indicated within an indexed and classified JSON incident is less than a preset minimum percentage of the average test benchmark score (e.g., 85%) for all similar processors (e.g., CPUs) in the plurality of other information handling systems (e.g., including 270) reporting to the UEM platform 200. This preset minimum percentage is just an example, and other values are contemplated. Further, preset minimum percentage may be defined on a component by component basis. In other words, the preset minimum percentage for determining whether a CPU is failing may be 85%, while the preset minimum percentage for determining whether a memory is failing may be 90%, for example.

The sustainability engine 281 in an embodiment may operate to recommend reuse of hardware components reporting poor hardware health at one information handling system (e.g., 250) in another information handling system (e.g., 270), depending on the operating parameters of the second information handling system (e.g., 270). Such poor hardware health in an embodiment may be reported in the form of an indexed and classified JSON incident flagged by the SIHA, as described directly above. For example, in an embodiment described in greater detail below with respect to FIG. 4, the sustainability engine 281 may identify a plurality of indexed and classified JSON incidents (e.g., first and second indexed and classified JSON incidents generated by the first and second client information handling systems 250 and 270, respectively, as described above) that each indicate failure of the same type of hardware component (e.g., CPU). In an embodiment in which the plurality of indexed and classified JSON incidents identified in such a way have differing incident classifications (e.g., "workload" classification in the first indexed and classified JSON incident and "config" classification in the second indexed and classified JSON incident), the sustainability engine 281 may determine that the cause of the CPU failure at the first client information handling system 250 (e.g., high workload on the CPU 242) differs from the cause of the CPU failure at the second client information handling system 270 (e.g., end of life for the CPU 272). This may indicate that the CPU 242 of the first client information handling system 250 in an embodiment may perform satisfactorily in the absence of the high workload on the CPU 242, currently being generated by the first client information handling system 250. Because the second indexed and classified JSON incident generated at the second client information handling system 270 does not indicate similar high workload on the CPU in an embodiment, the sustainability engine 281 may recommend replacement of the CPU 272 at the second information handling system 270 with the processor 242 from the first information handling system 250, rather than replacement of the CPU 272 with a new processor. Use of the processor 242 at the second client information handling system 270 in such a way may extend the lifetime of the processor 242, thus delaying or negating a need to manufacture a new CPU for use at the second client information handling system 270, or even postponing replacement of the second component, and consequently decreasing GHG emissions associated with manufacturing, transportation, and waste disposal.

Upon receipt of such a token indicating user acceptable of the recommendation at the sustainability engine 281, the sustainability engine 281 in an embodiment may determine an estimated credit value associated with acceptance of the recommendation by the user of the first client information handling system 250 in an embodiment. Such an estimation may be made, for example, based on previous extensions of hardware lifetimes at other client information handling systems (e.g., 270) due to implementation of the same recommendation. As described above, prior to the hardware reuse recommendation system 280 transmitting the recommendation to the first client information handling system 250, the user of the second client information handling system 270 in an embodiment may approve a recommendation to decrease usage of a specific software application (e.g., code compiling software application) by restricting access of resources for a given hardware component (e.g., capping calls made to the processor 272) made available to the specific software application (e.g., code compiling software). This user-approved decrease in usage of such an application in an embodiment may have successfully extended the lifetime of the processor 272 of the second information handling system 270 by a measurable period. In such an example embodiment, the sustainability engine 281 may determine the length of the hardware life extension for the processor 272 resulting from the previous recommendation through reference to further telemetry routinely gathered from the second client information handling system 270 until the processor 272 was ultimately replaced. For example, the sustainability engine 281 may determine the previous recommendation extended the lifetime of the processor 272 at the second information handling system 270 by ten days. In such an example embodiment, the sustainability engine 281 may further determine a credit value for such a lifetime extension by dividing the purchase price of processor 272 by the known average lifetime (in days) of other processors of the same type as processor 272, and multiplying that value by the determined lifetime extension (e.g., ten days). For example, extending the lifetime of a processor 272 originally costing $500 with a predicted lifetime of two years by ten days may result in estimated credit value savings of $6.85.

In such embodiments, the sustainability engine 281 may transmit determined recommendations to the recommendation agent 289 of the client information handling system 250. In some embodiments, the sustainability engine 281 may only recommend reuse of hardware components among client information handling systems (e.g., 250 and 270) located within the same geographic area. For example, the sustainability engine 281 in an embodiment may only recommend reuse of the processor 242 at the second client information handling system 270 if the location mapper (e.g., 264) or GPS unit (e.g., 249) for the first and second client information handling systems 250 and 270 indicate that these devices are located within a preset maximum distance of one another. More specifically, such reuse may only be recommended if these devices are located within the same city, campus, building, server room, or laboratory, for example.

The sustainability engine 281 in some embodiments may reference a recommendation validation score associated with this recommendation and describing the frequency with which such a recommendation has been either accepted or rejected by users in the past, prior to transmitting such a recommendation to an information handling system currently experiencing failure of underperformance of that hardware component (e.g., 220, 241, 242, 243, 244, 245a, 245b, 246, 247, 248, or 249). For example, after determining at a sustainability engine 281 a recommended reuse of a processor experiencing high workload at a client information handling system not currently experiencing such a high workload, the sustainability engine 281 may ensure the validation score associated with that recommendation meets a preset validation score minimum threshold before transmitting the recommendation to any further client information handling systems.

The sustainability engine 281 in such an embodiment may further generate recommendation JSON incidents incorporating all of the information from the first and second indexed and classified JSON incidents received from the client information handling system 250 described above and additionally describing the transmitted recommendations. For example, the sustainability engine 281 may store a first recommendation JSON incident in telemetry 282 pointing to the first indexed and classified JSON incident described above that included a JSON incident named "incident_id," and a value of 456789. As shown directly below, such a first recommendation JSON incident may further include a new incident identification (e.g., 789456) identifying the first recommendation JSON incident individually, a timestamp associated with the time at which the recommendation was transmitted to the recommendation agent at the first information handling system 250, what the recommendation was (e.g., replace CPU with new hardware), and the incident classification of the first indexed and classified JSON incident that prompted the recommendation:

```
{
  "data" :
  {
    "incident_id" : 789456,
    "timestamp_unixtime_ms" : 1655156447,
    "custom_flags" :
    {
      "incident_id" : 456789
      "Recommendation" : "replace_CPU_new_component"
    }
  }
  "incident_class" : Workload
}
```

As another example, the sustainability engine 281 may store a second recommendation JSON incident in telemetry 282 pointing to the second indexed and classified JSON incident described above that included a JSON incident named "incident_id," and a value of 456789. As shown directly below, such a second recommendation JSON incident may further include a new incident identification (e.g., 453459) identifying the second recommendation JSON incident individually, a timestamp associated with the time at which the recommendation was transmitted to the recommendation agent at the second information handling system 270, what the recommendation was (e.g., reuse CPU from the first client information handling system 250, as identified by the device ID 123456 given in the first indexed and classified JSON incident), and the incident classification of the first indexed and classified JSON incident that prompted the recommendation:

```
{
  "data" :
  {
    "incident_id" : 456852,
    "timestamp_unixtime_ms" : 1655156447,
    "custom_flags" :
    {
      "incident_incident_id" : 453459
      "Recommendation" : "reuse_CPU_deviceID_123456"
    }
  }
  "incident_class" : Config
}
```

The recommendation agent 289 and the recommendation agent 271 in an embodiment may receive these recommendations from the sustainability engine 281, and prompt the users of the first and second client information handling system 250 or 270 to either accept or reject implementation of those suggestions (e.g., via the GUI 290 at the first client information handling system 270). For example, the GUI 290 may allow the user to select a button or field for approval or denial of a recommendation to replace the CPU 242 with a new processor. In another example embodiment, a similar GUI at the second client information handling system 270 may allow the user to select approval or denial of a recommendation to reuse the CPU 242 at the second information handling system 270, rather than replacing the CPU 272 with a new component. In still another example embodiment, the sustainability engine 281 may transmit these recommendations to the enterprise management system 205, and an IT professional for the enterprise system may select whether to accept or reject these recommendations on behalf of the users of the first client information handling system 250 and the second client information handling system 270.

In an embodiment in which the users of the client information handling systems (e.g., 250 and 270) perform the step of accepting or rejecting the sustainability engine 281 recommendations themselves, the recommendation agents (e.g., 289 and 271) may transmit to the sustainability engine 281 a digital token indicating acceptance of the recommendation in an embodiment in which the user accepts the recommendation (e.g., via the GUI 290). In some embodiments, the recommendation agents (e.g., 289 and 271) may also transmit to the sustainability engine 281 a notification indicating rejection of the recommendation when the user rejects the recommendation (e.g., via the GUI 290).

In some embodiments, the sustainability engine 281 may adjust a recommendation validation score associated with the recommendation, based on receipt of a digital token indicating acceptance of the recommendation by a user, or a notification that the user has rejected the recommendation. Such a recommendation validation score in an embodiment may indicate a number of times (or percentage of times) that a user has either accepted or rejected a recommendation to reuse a hardware component underperforming at one client information handling system (e.g., 250) at another client information handling system (e.g., 270) in order to extend lifetime of the given hardware component. As described above, the sustainability engine 281 in some embodiments may reference this recommendation validation score prior to transmitting such a recommendation to an information handling system currently experiencing failure of underperformance of that hardware component (e.g., 220, 241, 242, 243, 244, 245a, 245b, 246, 247, 248, or 249). For example, after determining at a sustainability engine 281 a recommend reuse of a hardware component (e.g., CPU 242) currently underperforming or failing at a first client information handling system 250 at a second client information handling system 270, the sustainability engine 281 may ensure the validation score associated with that recommendation meets a preset validation score minimum threshold before transmitting the recommendation to any further client information handling systems. In such a way, the hardware reuse recommendation system in an embodiment of the present disclosure may classify information handling systems by similarity of operating environments, and provide recommendations for extension of life for underperforming hardware components based on user-approved recommendations to other client devices experiencing similar hardware failures.

Figure 3:
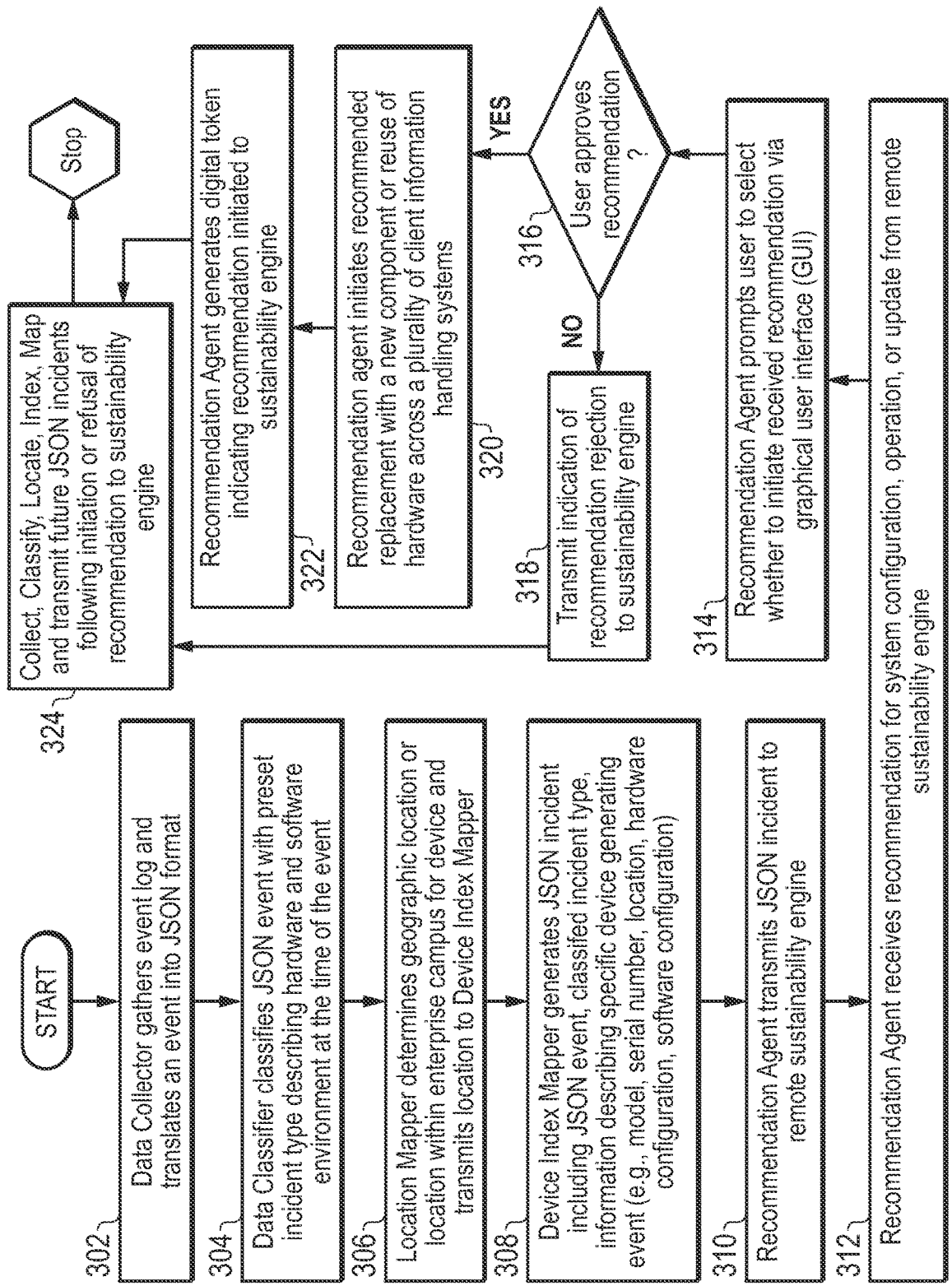
FIG. 3 is a flow diagram illustrating a method of receiving recommendations for reuse of underperforming hardware components according to an embodiment of the present disclosure.

FIG. 3 is a flow diagram illustrating a method of transmitting telemetry data describing an operating environment of a client information handling system and receiving recommendations for reuse of underperforming hardware components in differing operating environments according to an embodiment of the present disclosure. As described herein, the hardware reuse recommendation system in an embodiment may determine recommendations to reuse hardware components currently underperforming in one operating environment at another client information handling system experiencing a different operating environment in order to extend the lifetimes of commonly replaced hardware components. These recommendations may be based, in various embodiments described herein, on crowd-sourced telemetry data for previously user-approved adjustments or hardware component replacement to other client information handling systems experiencing similar hardware component failures. FIG. 3 may describe collection of telemetry data across a pool of client information handling systems necessary to make such determined recommendations.

At block 302, a data collector of a client information handling system in an embodiment may gather event log data, or reports from analytics engines such as hardware analytics applications or software analytics applications, and translate these logs or reports into a predetermined data interchange format such as JavaScript Object Notation (JSON), Extensive Markup Language (XML), or Yet Another Markup Language (YAML). Any format may be used, but JSON is discussed herein by way of an example embodiment. For example, in an embodiment described with reference to FIG. 2, above, the data collector 261 may gather reports from the power analytics module 240 and the application analytics module 230 and event logs from the event viewer 265. The data collector 261 in such an embodiment may further translate these reports and logs into JSON incidents for later parsing, searching, and editing by various components of the first client information handling system 250 and the hardware reuse recommendation system 280. For example, the data collector 261 of the first client information handling system 250 may generate the following JSON incident based on the information gathered and stored in Table 1, above:

```
{
  "data" :
  {
    "incident_id" : 456789,
    "source_ID" : power_analytics_module,
    "timestamp_unixtime_ms" : 1544145336,
    "custom_flags" :
    {
      "CPU_workload_code_compiling_software_app" : 0.90,
      "WHEA_Error" : CPU,
    }
    "device_current_state" :
    {
      "NID_1_type" : WLAN,
      "NID_2_type" : WWAN,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "OS_Version" : 10.2
      "Video_Conference_App" : Active
      "Gaming_App" : Active
      "Code_Compiling_App" : Background
    }
  }
}
```

The data classifier in an embodiment may classify objects within the gathered JSON incident with preset incident types describing hardware component failures, or software application execution and usage for the client information handling system at the time of the incident at block 304. For example, the data classifier 262 in an embodiment may edit the JSON incident created at block 302 by adding an incident classifier. More specifically, the data classifier 262 in an embodiment may analyze the JSON incident generated at block 302 to identify whether any of the JSON events and values associated with preset incident classifiers appear within the JSON incident. For example, the data classifier 262 in an embodiment may determine the JSON incident described above includes the JSON event named "CPU_workload," having a value of 0.90, or 90%, which is greater than the preset maximum CPU workload of 85%. In such an embodiment, the data classifier 262 in an embodiment may classify the JSON incident described above as "workload," indicating a high detected workload may be causing decreased efficiency or functionality of one or more hardware components. The data classifier 262 in an embodiment may apply such a classification by editing the JSON incident received from the data collector 261 to generate a classified JSON incident:

```
{
  "data" :
  {
    "incident_id" : 456789,
    "source_ID" : power_analytics_module,
    "timestamp_unixtime_ms" : 1544145336,
    "custom_flags" :
    {
      "CPU_workload_code_compiling_software_app" : 0.90,
      "WHEA_Error" : CPU,
    }
    "device_current_state :
    {
      "NID_1_type" : WLAN,
      "NID_2_type" : WWAN,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "OS_Version" : 10.2
      "Video_Conference_App" : Active
      "Gaming_App" : Active
      "Code_Compiling_App" : Background
    }
  }
  "incident_class" : Workload
}
```

In other embodiments, the classified JSON incident may reference other incident classifications. For example, the classified JSON incident may reference an incident classification for "Config," identifying a hardware configuration or policy that may result in various hardware component failures, or identifying that the hardware component has reached a projected end of life. The classification JSON event name "Config" in such an embodiment may have a value such as "full_power_mode" (e.g., indicating full power supplied to the monitor), "active_sensing_mode" (e.g., indicating sensing hardware components set to remain on), "High_Definition_Mode" (e.g., indicating GPU or monitor set to display in high definition), or "device_end_of_life" (e.g., indicating the component has reached a preset and projected end of life). In another example, the classified JSON incident may reference an incident classification for "app_usage," identifying relatively intensive usage of software applications that may result in various hardware component failures in an embodiment. The classification JSON event name "app_usage" in such an embodiment may have a value exceeding 85%. In still another example, the classified JSON incident may reference an incident classification for "driver_performance," identifying poor or inefficient driver performance (e.g., as indicated by a percentage of calls to that driver resulting in an error over a preset time period) that may result in various hardware component failures in an embodiment. The classification JSON event name "driver_performance" in such an embodiment may have a value exceeding 50%. In yet another example, the classified JSON incident may reference an incident classification for "background_usage," identifying relatively intensive usage of software applications operating in idle mode or in the background that may result in various hardware component failures in an embodiment. The classification JSON event name "background_usage" in such an embodiment may have a value exceeding 85%.

At block 306, a location mapper of the client information handling system may determine a geographic location or location within an enterprise campus, or a wider geographic area for the client information handling system and transmit the location to the device index mapper in an embodiment. For example, the device index mapper 263 may retrieve a location for the first client information handling system 250 from the location mapper 264 or the GPS unit 249. In some cases, the location mapper 264 may represent the location of the first client information handling system 250 with reference to its location within a campus of an enterprise or among plural campuses or operating locations. More specifically, the first client information handling system 250 may be located on a specific floor of a specific building.

The device index mapper in an embodiment may generate a JSON incident including one or more JSON events and classified incident types at block 308. For example, the device index mapper 263 in an embodiment may associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. The device index mapper 263 in an embodiment may then edit the classified JSON incident to generate a first indexed and classified JSON incident that includes this information:

```
{
  "data" :
  {
    "client_device_ID" : 123456,
    "client_device_model" : Laptop_7400,
    "incident_id" : 456789,
    "source_ID" : power_analytics_module,
    "timestamp_unixtime_ms" : 1544145336,
    "location" : Austin_Texas,
    "custom_flags" :
    {
      "CPU_workload_code_compiling_software_app" : 0.90,
      "WHEA_Error" : CPU,
    }
    "device_current_state :
    {
      "NID_1_type" : WLAN,
      "NID_2_type" : WWAN,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "OS_Version" : 10.2
      "Video_Conference_App" : Active
      "Gaming_App" : Active
      "Code_Compiling_App" : Background
```

-continued

```
    }
  }
  "incident_class" : Workload
}
```

As described above with reference to FIG. 2, the process described by blocks 302-308 in various embodiments may be repeated by a plurality of client information handling systems (e.g., 250 and 270). For example, a second client information handling system 270 in an embodiment may generate a second indexed and classified JSON incident shown directly below, indicating failure of the CPU 272 at the second client information handling system 270, located in Dallas, TX, due to the CPU 272 reaching a projected end of life:

```
{
  "data" :
  {
    "client_device_ID" : 951357,
    "client_device_model" : Laptop_5400,
    "incident_id" : 456852,
    "source_ID" : power_analytics_module,
    "timestamp_unixtime_ms" : 1544145449,
    "location" : Dallas_Texas,
    "custom_flags" :
    {
      "WHEA_Error" : CPU,
      "Device_End_of_Life" : CPU,
    }
    "device_current_state :
    {
      "NID_1_type" : WLAN,
      "NID_2_type" : WWAN,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "OS_Version" : 10.2
      "Video_Conference_App" : Active
      "Gaming_App" : Active
    }
  }
  "incident_class" : Config
}
```

At block 310, a recommendation agent of the client information handling system may transmit the JSON incident(s) generated at block 308 to a remote sustainability engine of the hardware reuse recommendation system in an embodiment. For example, the recommendation agent 289 of the first client information handling system 250 in an embodiment described with reference to FIG. 2 may transmit the first indexed and classified JSON incident to the sustainability engine 281 operating at the UEM platform 200. Similarly, the second recommendation agent 271 may transmit the second indexed and classified JSON incident to the sustainability engine 281. As described in an embodiment with reference to FIG. 1, the hardware reuse recommendation system 180 may operate within the UEM platform that gathers telemetries from a plurality of client information handling system endpoints 150 via the network 170, that describe operating environments for those client information handling systems (e.g., 150). The UEM platform in an embodiment may operate as a cloud-based service to store data (e.g., operating environment telemetries for remote client information handling systems 150) within memory 102, static memory 103, or computer readable medium 186 received via network 170.

The recommendation agent at the client information handling system in an embodiment may receive a recommendation for hardware component replacement with either a new component or a previously used component as system configuration recommendation at the client information handling system at block 312. For example, returning to the example embodiment described with reference to FIG. 2, the recommendation agent 289 for the first client information handling system 250 may receive the following first recommendation JSON incident from the sustainability engine 281, as described in greater detail below with respect to FIG. 4 at blocks 412 and 414:

```
{
  "data" :
  {
    "incident_id" : 789456,
    "timestamp_unixtime_ms" : 1655156447,
    "custom_flags" :
    {
      "incident_incident_id" : 456789
      "Recommendation" : "replace_CPU_new_component"
    }
  }
  "incident_class" : Workload
}
```

In another example embodiment, the recommendation agent 271 for the second client information handling system 270 may receive the following second recommendation JSON incident from the sustainability engine 281, as also described in greater detail below with respect to FIG. 4 at blocks 412 and 414:

```
{
  "data" :
  {
    "incident_id" : 456852,
    "timestamp_unixtime_ms" : 1655156447,
    "custom_flags" :
    {
      "incident_incident_id" : 453459
      "Recommendation" : "reuse_CPU_deviceID_123456"
    }
  }
  "incident_class" : Config
}
```

At block 314, the recommendation agent may prompt the users of the first or second client information handling systems, via a graphical user interfaces (GUIs) to select whether to initiate the received recommendation in an embodiment. For example, the recommendation agent 289 in an embodiment may prompt the user, via GUI 290, to either accept or reject a recommendation identified directly above in the first recommendation JSON incident to replace the CPU 242 with a new component. In another example, the recommendation agent 271 in an embodiment may prompt the user of the second client information handling system 270 (e.g., via a GUI similar to 290) to either accept or reject a recommendation identified directly above the second recommendation JSON incident to replace the CPU 272 with the CPU 242 at the first client information handling system 250 currently underperforming or failing at the first client information handling system 250 due to a workload state.

The recommendation agent in an embodiment may determine at block 316 whether the users of the first or second client information handling systems has approved the received recommendation. In an embodiment in which either user has selected to accept the recommendation via the GUI (e.g., 290), the client recommendation agents 289 or 271 may transmit an indication of the selection to the UEM platform 200. If the user has not approved the recommendation for replacement of hardware components from the hardware reuse recommendation system, this may indicate user concern that the adjustment may degrade user experience in an example embodiment, and the method may proceed to block 318 to transmit an indication of rejection to the sustainability engine. If the user has approved the recommendation for hardware replacement received from the hardware reuse recommendation system, the method may proceed to block 320 for execution of the recommended replacement.

At block 318, in an embodiment in which the user has not approved the recommendation for hardware replacement with a new component at the first information handling system or reuse of a component from the first information handling system at a second information handling system, received from the hardware reuse recommendation system, the recommendation agent may transmit an indication of the recommendation rejection to the sustainability engine. Such a rejection may indicate user concern that the adjustment may degrade user experience in an example embodiment. The method may then proceed to block 324 for routine collection, classification, location, index mapping, and transmission of future JSON incidents to the sustainability engine.

In an embodiment in which the user has approved the recommendation for replacement of hardware components with new components or reuse of hardware components from other client information handling systems from the hardware reuse recommendation system via the recommendation agent, the recommendation agent may initiate the recommended replacement at block 320. For example, in an embodiment in which the recommendation was to replace the identified hardware component (e.g., CPU 242) with a new hardware component, the recommendation agent 289 may either automatically order a new replacement component, or may transmit an indication to the enterprise management system 205 requesting such a replacement order. In another embodiment in which the recommendation was to replace the identified hardware component (e.g., CPU 272) with a previously underperforming or failing component from another client information handling system, the recommendation agent 271 may transmit instructions to the user of the first client information handling system 250 (e.g., via recommendation agent 289) or an IT professional for the enterprise (e.g., via enterprise management system 205) to ship or transport the CPU 242 from the first client information handling system 250 for integration within the second client information handling system 270.

At block 322, the recommendation agent may generate a digital token indicating the recommended adjustment received from the hardware reuse recommendation system has been made in an embodiment. In an example embodiment described with reference to FIG. 2, the recommendation agent 289 may generate a digital token using a random number generator specifically identifying the first client information handling system 250, or by distributing a token from a pool of digital tokens supplied to the enterprise management system 205 by the UEM platform 200. In such a way, digital tokens may not be duplicated across client information handling systems within the same enterprise management system.

At block 324, the client information handling system in an embodiment may routinely collect, classify, locate, index map, and transmit future JSON incidents to the hardware reuse recommendation system for use in determining future recommendations for adjustments to software application usage for the client information handling system or other information handling systems. Such routine monitoring may allow the hardware reuse recommendation system 280 to continuously provide recommendation for extension of hardware lifetimes for various components of a large pool of client information handling systems throughout the lifetime of the client devices. More specifically, the hardware reuse recommendation system 280 may monitor future indexed and classified JSON incidents to flag an incident indicating a final failure of the reused component (e.g., associated with end of life). In such a scenario, the hardware reuse recommendation system 280 may determine and store a lifetime extension value indicating the time period in which the hardware component was successfully reused prior to this final failure. As described in greater detail below with respect to FIG. 4, this stored lifetime extension value may be associated with the earlier recommendation to reuse the component, as a gauge of the extent to which such recommended reuse extended the lifetime of the component.

Further, as such recommendations are approved by users, the hardware reuse recommendation system 280 may build a library of information used to make recommendations known to avoid negative impacts on user experience. The method may then end. In such a way, client information handling systems in an embodiment may gather and transmit telemetries classified according to incident types used in determinations of recommendations for extension of life for underperforming hardware components across a plurality of client information handling systems.

Figure 4:
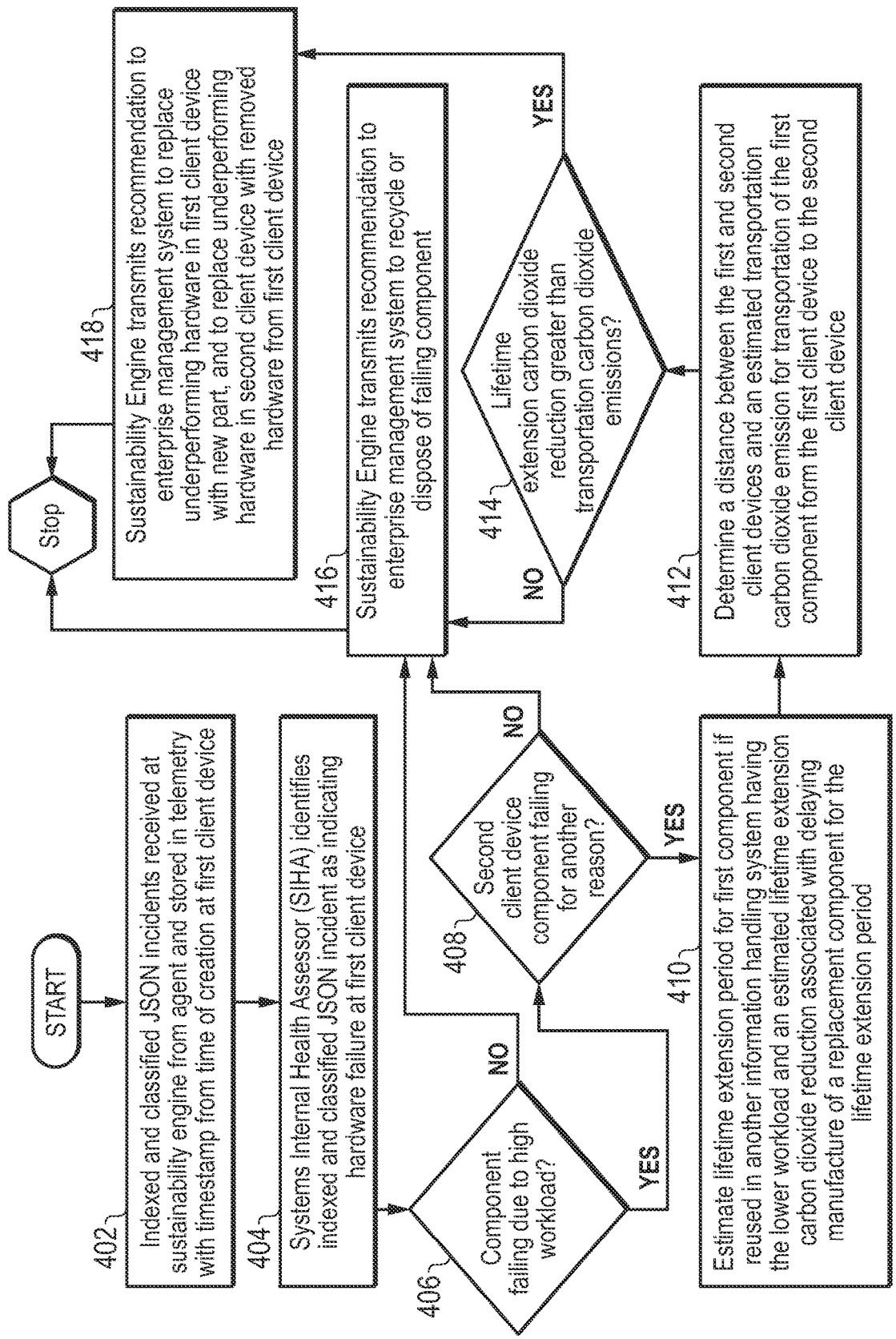
FIG. 4 is a flow diagram illustrating a method of determining recommendations to reuse hardware components across client information handling systems to extend hardware life according to an embodiment of the present disclosure.

FIG. 4 is a flow diagram illustrating a method of determining recommendations to extend hardware life by reusing hardware components across client information handling systems experiencing differing operating environments, according to an embodiment of the present disclosure. As described herein, the hardware reuse recommendation system in an embodiment may determine recommendations to reuse hardware components underperforming in a first operating environment at a second client information handling system experiencing a differing operating environment in order to extend the lifetimes of commonly replaced hardware components across a plurality of client information handling systems. Further, the hardware reuse recommendation system in various embodiments may only recommend adjustments that have been previously accepted and executed successfully by other users of other information handling systems experiencing similar hardware failures, indicating user satisfaction. In such a way, the hardware reuse recommendation system may decrease the likelihood of future recommendations negatively impacting user experience at other client information handling systems. FIG. 4 may describe grouping of client information handling systems according to similarity of hardware failures and generation of recommendations based on user-approved adjustments to software usage at client information handling systems experiencing similar hardware failures, to extend lifetimes of the same or similar underperforming hardware components across multiple client information handling systems.

At block 402, a plurality of indexed and classified JSON incidents may be received at a sustainability engine from a client information handling device recommendation agent and stored in telemetry with a timestamp from the time of creation at the client information handling system in an embodiment. JSON is an example format of a markup language. It is contemplated that any format may be used in other embodiments, including XML and YAML. For example, as described above at blocks 308 and 310 of FIG. 3, and referencing an embodiment described above with respect to FIG. 2, the recommendation agent 289 operating at a first client information handling system 250 may transmit the following first indexed and classified JSON incident to the sustainability engine 281 operating at the hardware reuse recommendation system 280:

```
{
  "data" :
  {
    "client_device_ID" : 123456,
    "client_device_model" : Laptop_7400,
    "incident_id" : 456789,
    "source_ID" : power_analytics_module,
    "timestamp_unixtime_ms" : 1544145336,
    "location" : Austin_Texas,
    "custom_flags" :
      {
        "CPU_workload_code_compiling_software_app" : 0.90,
        "WHEA_Error" : CPU,
      }
    "device_current_state :
      {
        "NID_1_type" : WLAN,
        "NID_2_type" : WWAN,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "OS_Version" : 10.2
        "Video_Conference_App" : Active
        "Gaming_App" : Active
        "Code_Compiling_App" : Background
      }
  }
  "incident_class" : Workload
}
```

As another example, as described above at blocks 308 and 310 of FIG. 3, and referencing an embodiment described above with respect to FIG. 2, the recommendation agent 271 operating at a second client information handling system 270 may transmit the following second indexed and classified JSON incident to the sustainability engine 281 operating at the hardware reuse recommendation system 280:

```
{
  "data" :
  {
    "client_device_ID" : 951357,
    "client_device_model" : Laptop_5400,
    "incident_id" : 456852,
    "source_ID" : power_analytics_module,
    "timestamp_unixtime_ms" : 1544145449,
    "location" : Dallas_Texas,
    "custom_flags" :
      {
        "WHEA_Error" : CPU,
        "Device_End_of_Life" : CPU,
      }
    "device_current_state :
      {
        "NID_1_type" : WLAN,
        "NID_2_type" : WWAN,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "OS_Version" : 10.2
        "Video_Conference_App" : Active
        "Gaming_App" : Active
      }
  }
  "incident_class" : Config
}
```

A systems internal health assessor (SIHA) of the sustainability engine platform in an embodiment may identify one or more of the plurality of indexed and classified JSON incidents received at block 402 as indicating failure of a hardware component of a given hardware type, or substantial functional inefficiency of the same at block 404. For example, the SIHA 283 in an embodiment may search the first indexed and classified JSON incident described above, which has been transmitted to the sustainability engine 281 and stored in telemetry 282 to identify the JSON event named "WHEA_Error," having a value CPU, indicating an error, such as a substantial inefficiency in the function at the CPU 242 of the first client information handling system 250. The SIHA 283 in an example embodiment may determine that the CPU 242 is failing if one or more indexed and classified JSON incidents for the information handling system (e.g., 250) using that hardware component (e.g., 242) include a number of WHEA errors for that component (e.g., 242) that meets or exceeds a maximum error threshold (e.g., 100, 50, 10, 5) within a preset period of time (e.g., 24 hours). These are only example maximum error threshold values and preset time period values, and any values for these thresholds are contemplated herein. As another example, the SIHA 283 may determine that the CPU 242 is failing if one or more indexed and classified JSON incidents for the information handling system 250 indicate a test benchmark score for that component (e.g., 242) that falls below a preset minimum benchmark threshold value (e.g., 85% of average crowd-sourced benchmark value), as described in greater detail above with respect to FIG. 2. The SIHA 283 in such embodiments may accordingly notify the sustainability engine 281 of the first indexed and classified JSON incident including such errors and indicating poor health of the identified hardware component (e.g., 242) at the first client information handling system 250.

A sustainability engine of the sustainability engine platform in an embodiment may determine at block 406 whether the component identified by the SIHA as failing at block 404 is failing due to a high workload on that component. In an embodiment in which the component is failing due to a high workload, it may be possible to reuse the component in an information handling system that does not place the same high workload on that component. In such a scenario, the lower workload on the component may not cause the same hardware failures seen at the information handling system burdening the failing component with the high workload. Thus, failure due to a high workload in an embodiment may present an opportunity for reuse of the component in a lower workload environment at another client information handling system, extending the life of the component.

In an embodiment, the sustainability engine 281 may determine whether the workload on the component is the likely cause of its failure by referencing the indexed and classified JSON incident flagged by the SIHA 283 as indicating such failure. For example, the first indexed and classified JSON incident may include an incident classification "workload," indicating a high workload. This may be the case due to the inclusion of the line "CPU_workload_code_compiling_software_app": 0.90, indicating the code compiling software application is currently utilizing 90 percent of the CPU resources, likely causing the CPU to generate the WHEA failures. In a contrasting example, the second indexed and classified JSON incident may include an incident classification "config," indicating a configuration or setting for the component may be the cause of the failure. This may be the case due to the inclusion of the line "Device_End_of_Life": CPU, indicating the CPU has reached a projected end of life, likely causing the CPU to generate the WHEA failures. If the component of the first client information handling system is failing due to high workload, this may present an opportunity to reuse the component, and the method may proceed to block 408 to determine whether another client information handling system is available for such reuse. If the component of the first client information handling system failing for a reason other than high workload, the method may proceed to block 416 to recommend replacement of the component with a new part, and no reuse of the failing component.

At block 408, in an embodiment in which the first client device component is failing due to a high workload, the sustainability engine may determine whether a second client device component of the same hardware type is failing for a reason other than a high workload. For example, the sustainability engine 281 may determine the first information handling system 250 CPU 242 is failing due to high workload, as described directly above with respect to block 406. In such an example embodiment, the sustainability engine 281 may also determine, based on the second indexed and classified JSON incident, that the second client information handling system 270 CPU 272 is also failing due to reaching a projected end of life. In some embodiments, the sustainability engine 281 may also reference the second indexed and classified JSON incident or other indexed and classified JSON incidents for the second client information handling system 270 stored in telemetry 282 to determine a current or average workload on the CPU 272, and ensure that the current or average workload on the CPU 272 is below the current workload on the CPU 242 that is causing it to fail. If a second component at a second client information handling system of the same hardware type as the first component is failing for another reason, the method may proceed to block 410 to determine whether reuse of the first component at the second client information handling system is appropriate. If there are no failing components of the same hardware type at other client information handling systems, or if the second component of the second information handling system is also failing due to high workload, reuse of the first component at the second information handling system may not be appropriate. In such a scenario, the method may proceed to block 416 for replacement of the first component at the first information handling system, without reuse of the first component at another information handling system.

The sustainability engine in an embodiment in which the second client device component is failing for a reason other than a high workload may estimate a lifetime extension period and associated carbon dioxide reduction if the hardware component is reused at block 410. In an example embodiment described above with respect to block 408 where the CPU 272 of the second client information handling system 270 is failing due to having reached the end of its projected lifetime, the sustainability engine 281 may reference the second indexed and classified JSON incident or other indexed and classified JSON incidents for the second client information handling system 270 stored in telemetry 282 to determine a current or average workload on the CPU 272. The sustainability engine 281 in such an embodiment may use this current workload to determine whether and to what extent previous recommendations for reuse of the same hardware component type at the same workload have successfully extended the lifetime of that hardware component.

For example, as described above with respect to block 324 of FIG. 3, the hardware reuse recommendation system 280 in an embodiment in which a recommendation for reuse has been approved previously may determine and store a lifetime extension value indicating the time period in which the hardware component was successfully reused prior to a final failure. These lifetime extension values may be associated with the recommendation that resulted in such reuse and with the indexed and classified JSON incident that prompted such a recommendation. The sustainability engine 281 in an embodiment may cross-reference these stored values or incidents to determine an estimated or average lifetime extension value for the same type of hardware component identified as failing at block 404 experiencing the same current or average workload at the second client information handling system 270 determined above at block 408. This may provide an estimation of the duration the lifetime of the component failing at the first client information handling system 250 may be extended by reusing it under the current or average workload at the second client information handling system 270. In other words, this may gauge the number of days, weeks, or years by which the lifetime of the failing component (e.g., CPU 242) may be extended by reusing it at the second information handling system 270, rather than disposing of it.

As described directly above, the sustainability engine 281 in such an embodiment may only base this determination on previous recommendation that were accepted by a user. Thus, previous recommendations that were rejected by a user, such as in anticipation of decreased user satisfaction resulting from the reuse of the component, may be excluded from consideration in determining whether reuse of the component is appropriate in the current circumstances. For example, the sustainability engine 281 in an embodiment described with reference to FIG. 2 may determine, based on the first indexed and classified JSON incident generated by the first client information handling system 250 that the CPU 242 is failing due to high workload on the CPU 242 by executing a code compiling software application or other particular software application or applications. If a user of the first client information handling system 250 has rejected a prior recommendation to decrease usage of that code compiling software application or other particular software application or applications, the sustainability engine 281 in an embodiment may determine that replacement of the CPU 242 with a new component capable of handling the high workload incurred by execution of the code compiling software or other particular software application or applications is necessary. In another example embodiment, prior recommendations to reuse CPUs from other client information handling systems in similar circumstances (e.g., when the currently installed CPU is failing due to high workload from the same or similar type of software application) may have failed to extend the lifetime of the reused CPU. In such an embodiment, the sustainability engine 281 may also recommend replacement of the CPU 242 with a new component, rather than reuse of other previously underperforming parts.

The sustainability engine 281 in an embodiment described with reference to FIG. 2, above, may determine whether and to what extent users of the same (e.g., 250 or 270) or different client information handling systems have successfully extended the lifetime of CPUs by reusing a CPU that underperformed or failed at a client information handling system due to high workload on the CPU at another client information handling system that placed a smaller workload on the CPU. In another example, the sustainability engine 281 may determine whether CPU lifetime has previously been extended by reusing a CPU previously underperforming or failing at a client information handling system due to high workload on the CPU specifically from execution of the code compiling software or other particular software application or applications identified within the first indexed and classified JSON incident in another client information handling system not executing the same code compiling software or other particular software application or applications. In other words, the sustainability engine 281 in an embodiment may compare recommendations based on workload alone, or on workload incurred by execution of specific software applications in various embodiments.

The sustainability engine 281 in such an embodiment may further work with the CO2 Optimization Engine 285 to determine an estimated lifetime extension CO2 reduction value associated with this estimated lifetime extension duration. For example, the CO2 Optimization Engine 285 in an embodiment may store estimated values of CO2 emitted during manufacture of the hardware component (e.g., 242) identified as failing due to high workload, as well as an estimated lifetime duration for that component or hardware type (e.g., CPU). The sustainability engine 281 in such an embodiment may access this information to determine how many days of functional performance the CO2 emitted during manufacture of that component provided. Any increase in this time period may ultimately decrease overall CO2 emitted during manufacture of similar hardware components by delaying the need to manufacture new replacement parts. By multiplying the estimated or average lifetime extension value by the CO2 emitted during manufacture of the component and dividing by the estimated lifetime duration for that component, the sustainability engine 281 in an embodiment may determine an estimated lifetime extension carbon dioxide reduction associated with delaying manufacture of a replacement component by the estimated or average lifetime extension value.

At block 412, the CO2 Optimization Engine and the sustainability engine 281 may determine an estimated transportation carbon dioxide emission value associated with transporting the failing hardware component from the first client device to the second client device. For example, the sustainability engine 281 in an embodiment may determine, based on the first and second indexed and classified JSON incidents, the location of each of the first and second client information handling systems (e.g., 250 and 270, respectively), and the distance between those locations. Using stored information describing CO2 emissions associated with mileage of transportation and the distance between the client devices, the CO2 Optimization Engine 285 may determine an estimated transportation carbon dioxide emission value that would likely result from transporting the first component (e.g., 242) from the location of the first client information handling system 250 to the location of the second client information handling system 270. This transportation carbon dioxide emission value in an embodiment may represent the only CO2 likely to be emitted during execution of a recommendation to reuse the component.

The sustainability engine in an embodiment may determine at block 414 whether the lifetime extension carbon dioxide reduction is greater than the transportation carbon dioxide emission. Reuse of the first component (e.g., 242) at the second information handling system (e.g., 270) in an embodiment may only result in reduced carbon dioxide emissions if the reuse of the component results in a carbon dioxide reduction that is greater than the carbon dioxide likely to be emitted during transport of the component for such recommended reuse. Thus, the sustainability engine may determine whether the lifetime extension carbon dioxide reduction determined at block 410 is greater than the transportation carbon dioxide emissions determined at block 412. If the lifetime extension carbon dioxide reduction is not greater than the transportation carbon dioxide emissions, this may indicate that reuse of the component in the second information handling system will not result in overall reduction of carbon dioxide, and the method may proceed to block 416 for recommended disposal or recycling of the failing component. If the lifetime extension carbon dioxide reduction is greater than the transportation carbon dioxide emissions, this may indicate that reuse of the component in the second information handling system will result in overall reduction of carbon dioxide, and the method may proceed to block 418 for recommended reuse of the first component at the second information handling system.

At block 416, in an embodiment in which the component of the first information handling system is failing for a reason other than high workload, or reuse of the component at a second information handling system is not feasible or likely to reduce overall CO2 emissions, the sustainability engine may transmit a recommendation to dispose of or recycle the component failing at the first information handling system. For example, the sustainability engine 281 in an embodiment may make such a recommendation when there is not another information handling system in need of a replacement part of the same hardware type as the failing component, as described above with reference to block 408. In another example, the sustainability engine 281 may make such a recommendation when the reduction in carbon dioxide emissions associated with the projected lifetime extension due to reuse of the component in a second information handling system does not outweigh the carbon dioxide that will be emitted during transport of the component from the first information handling system to the second information handling system.

For example, in an embodiment in which the first and second client information handling systems 250 and 270 described with reference to FIG. 2 are not located within the preset maximum distance of one another (e.g., the same city, campus, building, server room, or laboratory), the sustainability engine 281 may recommend replacement of both the CPU 242 at the first client information handling system 250 and the CPU 272 at the second client information handling system 270 with new CPUs. This may be the case, for example, when the GHG emissions associated with the anticipated extension of CPU life due to reuse of the CPU 242 in the second client information handling system 270 are offset or overshadowed by the GHG emissions that would be associated with transporting the CPU 242 from the first information handling system 250 to the second information handling system 270. In such a case, GHG emissions may be minimized by replacement of both of the CPUs 242 and 272 by new components, and the method for recommending reuse of hardware components across client information handling systems may then end.

In an embodiment in which the reduction in carbon dioxide emissions associated with the projected lifetime extension due to reuse of the component in a second information handling system outweighs the carbon dioxide that will be emitted during transport of the component, the sustainability engine at block 418 may recommend replacement of the component at the first information handling system and reuse of the component at the second information handling system. For example, the sustainability engine 281 in such an embodiment may recommend replacement of the CPU 242 at the first client information handling system 250 with a new CPU. Because the second indexed and classified JSON incident generated at the second client information handling system 270 does not indicate similar high workload on the CPU in an embodiment, the sustainability engine 281 may also recommend replacement of the CPU 272 at the second information handling system 270 with the processor 242 from the first information handling system 250, rather than replacement of the CPU 272 with a new processor. Use of the processor 242 at the second client information handling system 270 in such a way may extend the lifetime of the processor 242, thus delaying or negating a need to manufacture a new CPU for use at the second client information handling system 270, and consequently decreasing GHG emissions associated with manufacturing, transportation, and waste disposal. The method for recommending reuse of hardware components across a plurality of information handling systems to extend hardware life may then end.

The blocks of the flow diagrams of FIGS. 3 and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A hardware reuse recommendation system executing on a management information handling system comprising:
a network interface device to receive a first operational telemetry for a first client information handling system and a second operational telemetry for a second client information handling system, wherein each operational telemetry includes an error associated with a hardware type, and measured workloads on a first component and a second component of the hardware type;
a processor to execute code instructions of the hardware reuse recommendation system to:
determine, based on the first operational telemetry and the second operational telemetry that the first component of the first client information handling system and the second component of the second client information handling system are failing, where the first component and the second component are of a same hardware type;
determine a first workload on the first component at the first client information handling system is causing a failure of the first component and that the first workload is higher than a second workload on the second component at the second client information handling system, where a previous recommendation has extended a lifetime duration of a third component of the same hardware type operating under a third workload that is greater than or equal to the second workload; and
the network interface device to transmit a first recommendation to the first client information handling system for replacement of the first component with a new component, and transmit a second recommendation to the second client information handling system for replacement of the second component with the first component to extend the life of the first component.

2. The information handling system of claim 1, wherein the hardware type is a type of processing unit.

3. The information handling system of claim 1, wherein the hardware type is a type of memory hard drive.

4. The information handling system of claim 1, wherein the hardware type is a type of power supply unit.

5. The information handling system of claim 1, wherein the hardware type is a type of fan.

6. The information handling system of claim 1 further comprising:
the processor determining a lifetime extension carbon dioxide reduction associated with reuse of the first component at the second client information handling system is greater than a transportation carbon dioxide emission to transport the first component to the second client information handling system.

7. The information handling system of claim 1 further comprising: the processor determining the second recommendation to the second information handling system for replacement of the second component with the first component is based on a previous user-approved recommendation for reuse of a third component of the same hardware type at a third client information handling system experiencing a third workload equivalent to the second workload.

8. A method of recommending reuse of hardware components across client information handling systems to extend hardware life comprising:
receiving a first operational telemetry for a first client information handling system and a second operational telemetry for a second client information handling system, via a network interface device, wherein each operational telemetry includes an error associated with a hardware type, and measured workloads on a first component and a second component of the hardware type;

determining, via a processor, based on the first operational telemetry and the second operational telemetry that the first component of the first client information handling system and the second component of the second client information handling system are failing, where the first component and the second component are of a same hardware type;

determining, via a processor, a first workload on the first component at the first client information handling system is causing a failure of the first component and that the first workload is higher than a second workload on the second component at the second client information handling system, where a previous recommendation has extended a lifetime duration of a third component of the same hardware type operating under a third workload that is greater than or equal to the second workload; and transmitting a first recommendation to the first client information handling system for replacement of the first component with a new component, and transmit a second recommendation to the second client information handling system for replacement of the second component with the first component to extend the life of the first component.

9. The method of claim 8, wherein the second workload on the second component is lower than the first workload on the first component by a preset minimum threshold value.

10. The method of claim 8 further comprising: determining the second workload on the second component is not a cause of a failure of the second component.

11. The method of claim 8 further comprising:
determining the second component has reached an estimated end of life.

12. The method of claim 8 further comprising:
determining that a lifetime extension carbon dioxide reduction associated with reuse of the first component at the second client information handling system is greater than a transportation carbon dioxide emission to transport the first component to the second client information handling system.

13. The method of claim 8, wherein the first information handling system and the second information handling system are computing servers.

14. The method of claim 8, wherein the first information handling system and the second information handling system are located at the same enterprise business campus facility.

15. A method of recommending reuse of hardware components across client information handling systems to extend hardware life comprising:

receiving a first operational telemetry for a first client information handling system and a second operational telemetry for a second client information handling system, via a network interface device, wherein each operational telemetry includes an error associated with a hardware type, and measured workloads on a first component and a second component of the hardware type;

determining, via a processor, based on the first operational telemetry and the second operational telemetry that the first component of the first client information handling system and the second component of the second client information handling system are failing, where the first component and the second component are of a same hardware type;

determining, via a processor, a first workload on the first component at the first client information handling system is causing a failure of the first component and that the first workload is higher than a second workload on the second component at the second client information handling system and that the second workload on the second component is not a cause of a failure of the second component, where a previous recommendation has extended a lifetime duration of a third component of the same hardware type operating under a third workload that is greater than or equal to the second workload; and transmitting a first recommendation to the first client information handling system for replacement of the first component with a new component, and transmit a second recommendation to the second client information handling system for replacement of the second component with the first component to extend the life of the first component.

16. The method of claim 15, wherein the second workload on the second component is lower than the first workload on the first component by a preset minimum threshold value.

17. The method of claim 15, wherein the hardware type is a type of processing unit.

18. The method of claim 15, wherein the hardware type is a type of memory hard drive.

19. The method of claim 15 further comprising:
determining that a lifetime extension carbon dioxide reduction associated with reuse of the first component at the second client information handling system is greater than a transportation carbon dioxide emission to transport the first component to the second client information handling system.

20. The method of claim 15, wherein the first information handling system and the second information handling system are computing servers.

* * * * *